United States Patent

[11] 3,633,597

| [72] | Inventor | Lowell A. Jobe<br>Idaho Falls, Idaho |
|---|---|---|
| [21] | Appl. No. | 41,458 |
| [22] | Filed | May 28, 1970 |
| [45] | Patented | Jan. 11, 1972 |
| [73] | Assignee | The United States of America as represented by the United States Atomic Energy Commission |

[54] FLOW RATE CONTROL METHOD
6 Claims, 1 Drawing Fig.

[52] U.S. Cl. .................................................. 137/8,
137/487.5
[51] Int. Cl. .................................................. F16k 31/02,
G05d 16/00
[50] Field of Search........................................ 137/14, 8,
487.5, 330, 331, 624.13, 624.15

[56] References Cited
UNITED STATES PATENTS

| 3,006,144 | 10/1961 | Arnett | 137/624.13 X |
| 2,741,088 | 4/1956 | Andrews | 137/624.15 X |
| 2,948,295 | 8/1960 | Smith | 137/487.5 |
| 3,098,595 | 7/1963 | Shelton | 137/330 X |

*Primary Examiner*—Alan Cohan
*Attorney*—Roland A. Anderson

ABSTRACT: The flow rate of a fluid through a conduit, in which solids buildup occurs, is controlled by introducing a time varying signal to a valve to control the rate of flow. The changes in fluid flow caused by the time varying signal act to flush out solids which have built up in the valve and/or conduit. The mean rate of flow is measured and maintained at a desired level by controlling the average valve opening.

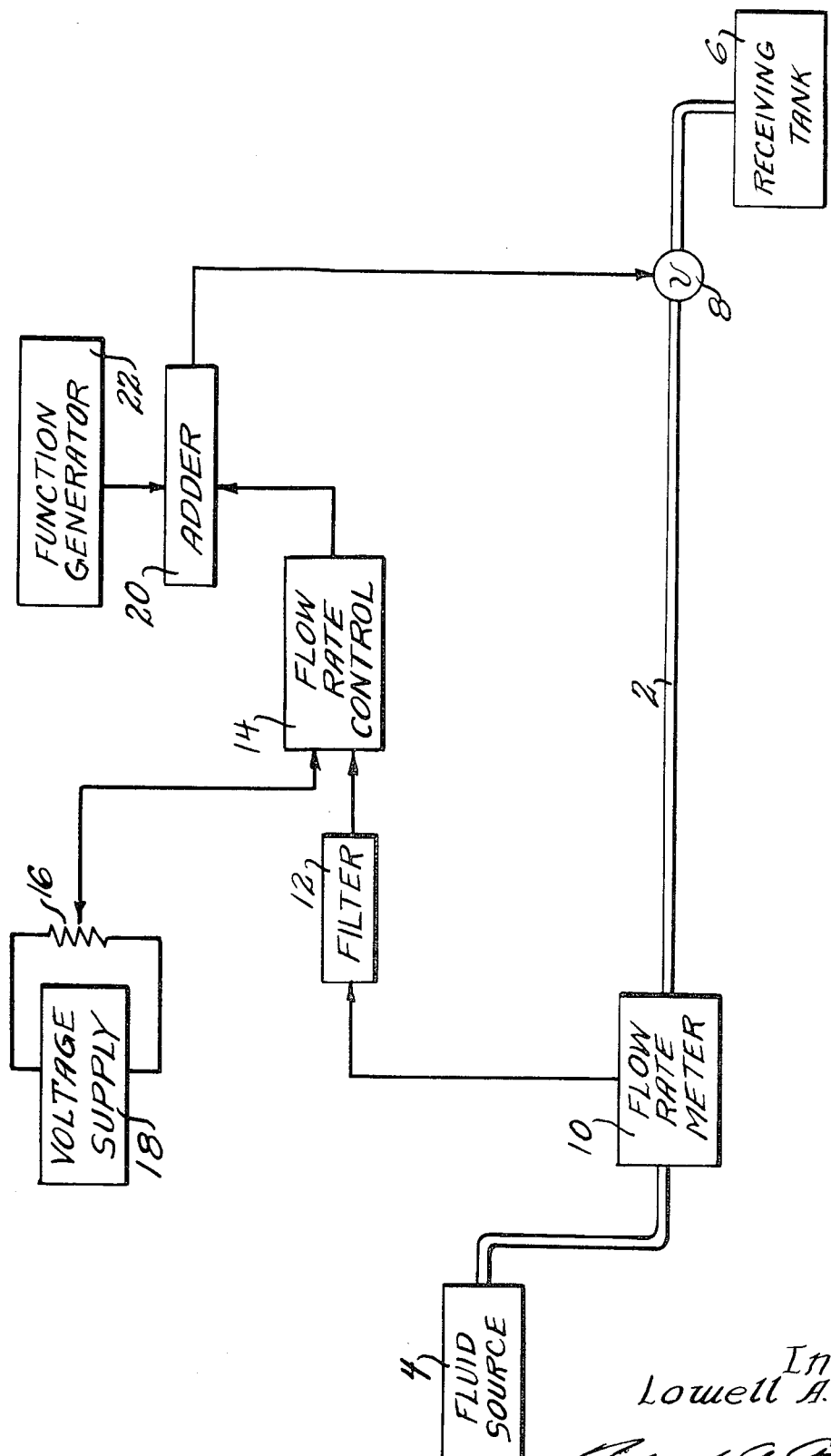

FLOW RATE CONTROL METHOD

CONTRACTUAL ORIGIN OF THE INVENTION

The invention described herein was made in the course of, or under, a contract with the UNITED STATES ATOMIC ENERGY commission.

BACKGROUND OF THE INVENTION

It has been observed that during flow of certain fluids through a valve held at a constant position the flow rate gradually decreases due to solids buildup in the conduits and/or valve from either suspended solids in the fluid or crystal-type buildup. Changing the rate of flow in an oscillatory manner greatly reduces the plugging tendencies in the conduits and valves. The oscillatory valve operation has been produced by operating the flow rate control system under high gain or sensitivity settings. This oscillating mode of operation, however, is at variance with normal satisfactory control practice, which aims for smooth and steady values of operating variables. The frequency of oscillation in this mode of operation is difficult to control and may be so high that early control valve failures due to fatigue will occur.

It is therefore an object of the present invention to provide an improved method for controlling the flow rate of a fluid in a conduit in which solids buildup occurs during a constant flow rate of the fluid.

It is another object of the present invention to provide a method for operating a fluid control valve in a controlled oscillatory manner and at a predetermined frequency for adjusting the flow rate of a fluid that has plugging tendencies in a conduit.

SUMMARY OF THE INVENTION

In practicing this invention a reference signal representative of the desired rate of fluid flow is used to control the fluid flow. A signal representative of the actual rate of fluid flow is derived and filtered to develop a signal representative of the mean rate of fluid flow. This signal is compared with the reference signal to develop an error signal representative of the difference between the desired flow rate value and the mean value of the flow rate. The error signal is added to an oscillatory signal having a predetermined frequency and wave shape and the resulting signal is added to the reference signal and applied to the control valve to adjust the flow rate of the fluid.

BRIEF DESCRIPTION OF THE DRAWING

The invention is illustrated in the single drawing, a block diagram of an embodiment of the invention.

PREFERRED EMBODIMENT OF THE INVENTION

A simplified fluid feed system exhibiting plugging tendencies is depicted by a conduit 2, such as steel tubing, a fluid source 4 connected to one end of the conduit 2 and including means for pumping fluid through the conduit 2, a receiving tank 6 connected to the other end of the conduit 2, and a control valve 8 connected to the conduit 2 for adjusting the flow rate of the fluid in conduit 2.

A control system for regulating control valve 8 according to the method of the present invention includes a conventional flow rate meter 10 in conduit 2. The output signal of flow rate meter 10 is connected to a filter 12. A flow rate controller 14 has a first input connected to the output of the filter 12 and a second input connected to the output of a potentiometer 16, which is connected across the output of a voltage source 18. The signal from potentiometer 16 is the set point or reference signal indicating the desired flow rate. The set point signal may be fixed as shown or it may be varied by external means as desired. The output of flow rate controller 14 is connected as one input to adder 20. Function generator 22 is connected as a second input to adder 20 and adder 20 is coupled to control valve 8 to control the rate of fluid flow.

Before operation, potentiometer 16 is adjusted to produce a voltage level at its output corresponding to a desired flow rate of the fluid in the conduit 2, and function generator 22 is adjusted to produce an oscillatory output having an amplitude and frequency to develop the desired oscillation of the control valve 8. The output signal of the function generator 22 may be a sine wave, triangular wave, ramp, rectangular wave, series of pulses or any special oscillatory waveform. The signal may also consist of alternating plus and minus pulses which will increase and decrease the fluid flow about an average desired value.

In operation, flow rate meter 10 senses the instantaneous flow rate of the fluid in conduit 2 and produces an electrical output signal proportional thereto. Filter 12, receiving the output signal of the flow rate meter 10, removes the oscillatory component in the fluid flow rate imparted to the fluid and produces an output signal proportional to the mean value of the fluid flow rate sensed by flow meter 10. Flow rate controller 14 develops an error signal proportional to the difference between the set point or reference signal and the output of filter 14, representing the mean value of the flow rate of the fluid in conduit 2. The error signal is added to the reference signal and this combined signal is coupled to adder 20. Adder 20 adds the oscillatory output of the function generator 22 to the combined signal from flow rate controller 14. The signal output of adder 20 thus comprises a reference signal component, an error signal component having an amplitude depending on the deviation of the mean value of the sensed fluid flow rate from a predetermined desired flow rate and an oscillatory signal component having a predetermined amplitude and frequency. The output of adder 20 drives the control valve 8 adjusting the flow rate such as to reduce the magnitude of the error signal and to impart an oscillatory motion to the fluid in conduit 2.

Thus, if the mean value of the fluid flow rate at the output of flow rate controller 14 is smaller than a desired fluid flow rate represented by the output of potentiometer 16, the error signal component of the output signal of adder 20 drives control valve 8 in a direction such as to increase the fluid flow rate, thereby decreasing the magnitude of the error signal. Conversely, if the mean value of the fluid flow rate is greater than the desired flow rate, the error signal component of the output of adder 20 drives control valve 8 in a direction such as to decrease the fluid flow rate, thereby decreasing the magnitude of the error signal. If the mean value of the fluid flow rate is equal to the desired flow rate, the error signal component is zero and the only signal driving the control valve 8 is the reference signal and the oscillatory signal.

The oscillatory signal component of the output of adder 20 operates the control valve 8 with a frequency determined by the frequency of the function generator 22, thereby reducing plugging tendencies of the fluid in the conduit 2. In a conventional high gain control system the valve may oscillate in an uncontrolled manner from 5 to 25 times per minute which produces excessive valve wear. In the system of this invention it has been found advantageous to supply an oscillating signal to the valve which has a period of 1 minute or more. It is also possible to supply an oscillatory signal which is not a sine wave as, for example, a triangular or rectangular wave may be used. In certain systems a rectangular wave has been found advantageous as it produces a sudden change in the rate of fluid flow, conducive to the breaking up of built-up solids. It should be understood that the oscillatory signal from function generator 22 is not limited to the periods and shapes disclosed above but any period and shape required may be used.

While the system described above has been primarily electrical, the present invention is not limited to an electrical control system. For example, a pneumatic, hydraulic or fluidic control system may be used, alone or in any desired combination, with an electrical control system.

The embodiments of the invention in which an exclusive property or privilege is claimed are defined as follows:

1. The method of controlling the flow rate of a fluid through a valve to prevent plugging of the valve, including the steps of:

a. measuring the flow rate of the fluid to develop a first signal proportional thereto;
b. filtering said first signal to develop a second signal proportional to the mean value of said first signal;
c. generating a reference signal proportional to a desired predetermined flow rate;
d. comparing said reference signal and said second signal to develop a difference signal;
e. generating an oscillatory signal having a period equal to or greater than 1 minute;
f. combining said oscillatory signal and said difference signal to develop a time varying control signal; and
g. applying said time varying control signal to the valve to change the valve opening in response to the time varying control signal to control the flow rate of the fluid through the valve at an average flow rate and to move the valve over said period of said oscillatory signal to prevent plugging of the valve.

2. The method according to claim 1, wherein, said oscillatory signal is a sine wave.

3. The method according to claim 1 wherein, said oscillatory signal is a triangular wave.

4. The method according to claim 1 wherein, said oscillatory signal is a series of pulses.

5. The method according to claim 4 wherein, said series of pulses is in the form of a rectangular wave.

6. The method according to claim 4 wherein, said series of pulses are alternately plus and minus.

* * * * *